(No Model.)
J. McDONALD.
FLANGED RAILWAY AND TRAMWAY WHEEL.
No. 557,217. Patented Mar. 31, 1896.
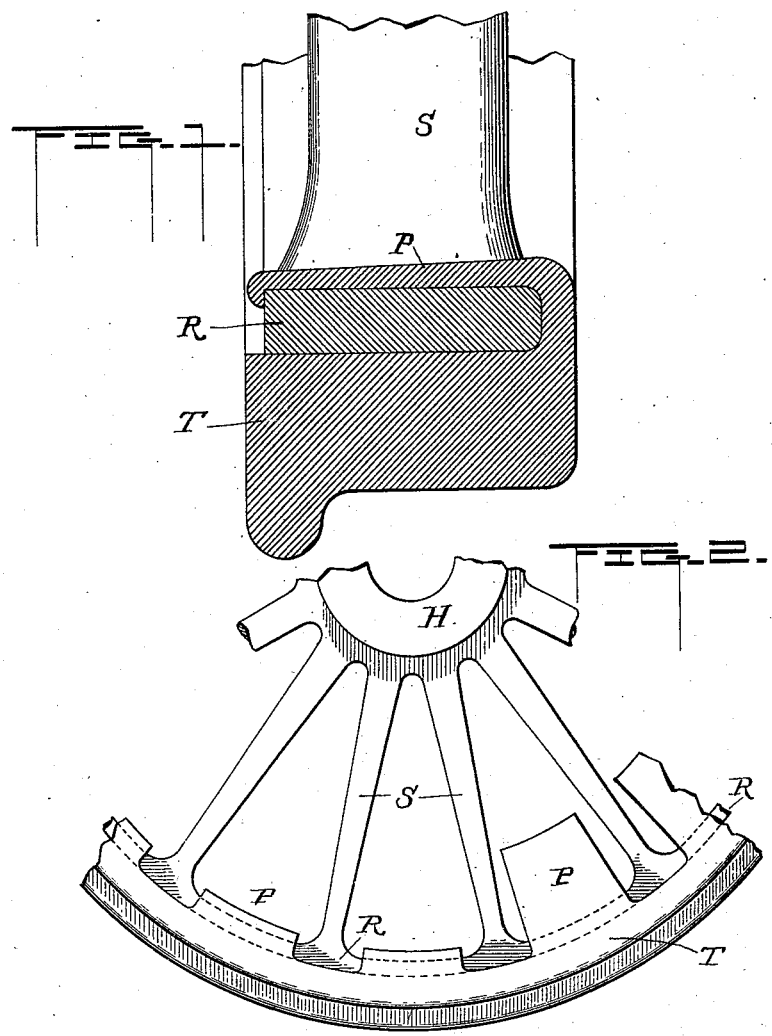
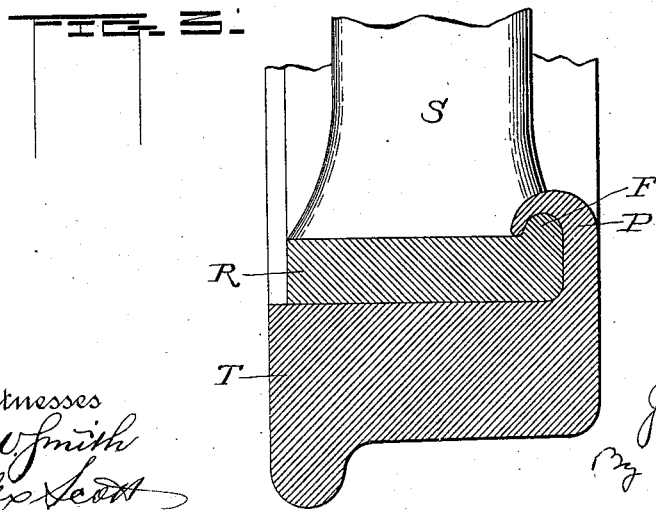
Witnesses
C. W. Smith
Alex Scott
Inventor
John McDonald,
By [signature]
Attorney

UNITED STATES PATENT OFFICE.

JOHN McDONALD, OF SHINBASI, JAPAN.

FLANGED RAILWAY AND TRAMWAY WHEEL.

SPECIFICATION forming part of Letters Patent No. 557,217, dated March 31, 1896.

Application filed July 2, 1895. Serial No. 554,738. (No model.) Patented in England March 21, 1895, No. 5,893.

*To all whom it may concern:*

Be it known that I, JOHN McDONALD, a citizen of the United Kingdom of Great Britain and Ireland, residing at Shinbasi, Tokio, in the Japanese Empire, have invented certain new and useful Improvements in Flanged Railway and Tramway Wheels, (patented to me in Great Britain, No. 5,893, dated March 21, 1895,) of which the following is a specification.

This invention relates to flanged wheels for railway and tramway locomotives and vehicles; and it consists in improved means for connecting the flanged tires with the rims of the wheels.

The accompanying drawings illustrate in what manner the invention may be carried into effect, and are hereinafter referred to.

Figure 1 is a transverse sectional view of a rim and tire thereon, and Fig. 2 is a partial elevation of a flanged wheel in process of having its tire secured upon its rim. Fig. 3 is a modification.

H is the hub or boss of the wheel, S the spokes, R the rim, and T the flanged tire.

The object of my invention is to enable tires to be attached to the rims or naves of spoked railway-wheels or those having openings through the web near the rim. To this end the tire is provided with projections P, which correspond in number and position with the spaces between the spokes. When the tire has been placed in position on the rim, the projections P extend inwardly toward the boss H alongside the rim. They are long enough to be then bent downwardly, so as to overlap the inside of the rim and by engaging therewith hold the tire firmly in place. The projections may be bent over a flange or projection F on the inside of the rim and may be short, as shown in Fig. 3; but I prefer to make the projections P long enough to reach across the rim, as shown in Figs. 1 and 2, in which case the flange F may be omitted. The end may be turned down over the inner side of the rim, as shown, thus locking the tire firmly in place. This style of tire is applicable to existing wheels which have no flange or flanges F, and is therefore readily substituted for the ordinary tire when the wheels are brought in for repairs.

The projections P may be generally bent over cold; but if needed the tire may be heated so that they may be turned over hot.

In Fig. 2 two of the tire projections are represented as being already bent or clasped over the rim and the third open preparatory to bending.

Other advantages which follow from the adoption of these improvements are that the rim may be about as wide as the tire, thereby insuring a better gripping-surface; that no set-screws, rings, or other separate parts are required, with a consequent increase in the simplicity of construction and greater immunity from risk of breakage, and that adhesion-tires cannot possibly slip on the rims.

Having now particularly described and ascertained the nature of my said invention and in what manner the same is to be performed, I declare that what I claim is—

The combination with a spoked wheel for railway and tramway vehicles, having a rim, of a tire provided with inwardly-extending projections bent down upon and reaching across the inside of the rim, substantially as described.

In testimony that I claim the foregoing as my invention I have signed my name, in presence of two witnesses, this 4th day of June, 1895.

JOHN McDONALD.

Witnesses:
    EDWIN DUN,
    R. S. MILLER.